(12) United States Patent
Piper et al.

(10) Patent No.: US 6,806,885 B1
(45) Date of Patent: Oct. 19, 2004

(54) REMOTE MONITOR CONTROLLER

(75) Inventors: Glenn W. Piper, Meridian, ID (US); James J. Cathey, Eagle, ID (US); Glen E. Hush, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/259,226

(22) Filed: Mar. 1, 1999

(51) Int. Cl.⁷ .................................................. G09G 5/36
(52) U.S. Cl. ........................ 345/545; 345/2.1; 345/1.1
(58) Field of Search ........................ 345/2.1, 2.3, 204, 345/530, 545, 539, 564, 550, 501, 502, 213, 467

(56) References Cited

U.S. PATENT DOCUMENTS

| | | | | |
|---|---|---|---|---|
| 3,623,067 A | | 11/1971 | Deal et al. .............. 340/324 R |
| 3,872,446 A | * | 3/1975 | Chambers ................... 345/194 |
| 4,338,597 A | * | 7/1982 | Steiner et al. .............. 345/213 |
| 4,451,825 A | * | 5/1984 | Hall et al. .................. 345/467 |
| 4,626,837 A | * | 12/1986 | Priestly ...................... 345/204 |
| 4,763,120 A | * | 8/1988 | Morrish et al. ............. 345/550 |
| 4,804,948 A | * | 2/1989 | Nishi et al. ................. 345/186 |
| 4,811,284 A | * | 3/1989 | Adler et al. .................. 710/56 |
| 5,136,695 A | * | 8/1992 | Goldshlag et al. ........... 345/2.1 |
| 5,309,174 A | * | 5/1994 | Minkus ....................... 345/204 |
| 5,517,612 A | * | 5/1996 | Dwin et al. ................. 395/501 |
| 5,557,721 A | * | 9/1996 | Fite et al. ................... 709/217 |
| 5,657,478 A | * | 8/1997 | Recker et al. .............. 395/503 |
| 5,821,917 A | * | 10/1998 | Cappels ....................... 345/150 |
| 5,841,444 A | * | 11/1998 | Mun et al. .................. 345/506 |
| 5,874,928 A | * | 2/1999 | Kou .............................. 345/1 |

* cited by examiner

Primary Examiner—Kee M. Tung
(74) Attorney, Agent, or Firm—Dorsey & Whitney LLP

(57) ABSTRACT

A remote monitor controller decodes image data destined for a display associated to the controller, and continuously shows the image on the display until another image is provided to the controller. An image generating device, such as a personal computer, provides image data to as many displays as desired. The personal computer sends the image data to a controller associated with each display. The controller then formats the image to be shown on the display, and sits in an endless loop until another image is provided to it. Depending on the speed of the computer network, a range of options is available, from nearly static images that don't often change to full motion video on all of the displays. The controller includes an input module that receives a stream of digital data, a microcontroller that converts the digital data into image display data and stores it into a video RAM, and an output module that sends the stored image to the associated display.

40 Claims, 4 Drawing Sheets

REMOTE MONITOR CONTROLLER

GOVERNMENT RIGHTS

This invention was made with United States Government support under Contract No. DABT63-97-C-0001 awarded by the Advanced Research Projects Agency (ARPA). The United States Government has certain rights in this invention.

TECHNICAL FIELD

This invention is directed to a remote computer monitor controller and more particularly to a method and device to control multiple computer displays with only one personal computer.

BACKGROUND OF THE INVENTION

The vast majority of personal computers (PCs) include a video monitor display. Monitors are used to communicate information to the operator of the PC, such as displaying the text in a word processing application or a graph or chart showing data. Computer monitors are typically cathode ray tubes but can also be flat panel displays, such as liquid crystal or field emission displays.

A functional diagram of a typical personal computer system 10 having one associated monitor is shown in FIG. 1. A CPU 20, such as an Intel Pentium® processor or a K6 processor from Advanced Micro Devices, Inc. is linked to a local bus 22. Also coupled to the local bus 22 is a memory controller 24 that controls level-2 cache memory 26 and dynamic random access memory (DRAM) 28. Also coupled to the local bus 22 is a local bus/PCI bus bridge 30. This bus bridge 30 links the local bus 22 with a peripheral control interface (PCI) bus 32.

Attached to the PCI bus 32 are controllers of their own buses, such as an IDE controller 60 and a SCSI controller 62. These controllers are used to couple devices, such as hard drives, CD-ROM drives, DVD ROM drives, scanners, and other peripheral devices to the PCI bus 32 and ultimately to the CPU 20. The PCI bus 32 also contains PCI slots 34, 36, 38 which act as receptacles for "cards". These cards provide a mechanism by which external devices can communicate directly with the PCI bus 32 of the computer system 10. For instance as shown in FIG. 1, a video card 44 is installed into the PCI slot 34. The video card 44 contains circuitry that allows the CPU 20 to communicate to a computer monitor 48 by passing electrical signals over the PCI bus 32. The video card 44 senses these signals placed on the PCI bus 32 by the CPU 20 and converts them into analog signals for use by the monitor 48. A video cable 68 carries signals from the video card 44 to the monitor 48.

A network interface card (NIC) 46 is installed in the PCI slot 36 of the computer system 10. The NIC 46 contains circuitry that allows the computer system 10 to communicate to a computer network over a network cable 50. The network cable 50 plugs directly into the NIC 46. The NIC 46 is chosen to be compatible with a particular type of network to which the computer system 10 is to be connected, such as Token-Ring or Ethernet.

A PCI/ISA bus bridge 70 couples the PCI bus 32 to an Industry Standard Architecture (ISA) bus 72. Similar to the PCI bus 32, the ISA bus 72 has a number of slots, 92, 94, 96, 98, that are used to accept cards that communicate with the computer system 10 over the ISA bus 72. The ISA slots act as a separate physical extension to a corresponding number of XT slots, 82, 84, 86, and 88, respectively. Cards that fill one of the ISA slots also fill the corresponding XT slot. For example, the computer system 10 has an I/O adapter card 66 that sits in both XT slot 82 and ISA slot 92. All ISA cards must utilize ISA and XT slots while XT cards may only utilize XT slots. Cards placed in either the XT or ISA slots communicate with the CPU 20 via the ISA bus 72 through the bus bridges 70 and 30. Also coupled to the PCI/ISA bus bridge 70 are other components necessary for proper operation of the computer system 10, such as a ROM Bios 74, a real-time clock 76, and a keyboard/mouse controller 78.

In order to have more than one monitor 48 coupled to the computer system 10, an additional or different type of video card must be plugged into one of the PCI slots. Some operating systems, such as Microsoft Windows 98®, allow more than one monitor 48 to be operational at one time. However, the number of monitors 48 is dictated by the number of available PCI slots 34, 36, 38 available in the computer system 10. In the computer system 10 illustrated in FIG. 1, only one additional computer monitor 48 could be added, by inserting another video card (not shown) into the only open PCI slot, 38. Some newer video cards operate on an Accelerated Graphics Port (AGP) bus, which provides a faster data path between an AGP video card (not shown) and the CPU 20. Typically only one slot is provided to the AGP bus, thereby limiting the number of AGP video cards per system to one.

Some companies, such as Appian Graphics of Redmond, Washington, produce video cards that can display different images on multiple monitors from one video card. However, the number of monitors driven from one video card is limited to a fairly low number, such as 2 or 4. Additionally, Dexon Systems Limited of Great Britain produces hardware that allows multiple monitors to be attached to a computer system. However, in their system, the monitors are stacked on top of and next to one another in a matrix of rows and columns. The product allows this matrix of computer monitors to display only a single image, with every monitor showing a small portion of the total image.

U.S. Pat. No. 3,623,067 to Deal, Jr. teaches a master panel control unit for coordinating panels in a number of debarkation areas. However, each master panel must be uniquely associate with another panel in another area. Further, the panels of Deal, Jr. cannot contain images, but only numbers and letters in "illuminated lamps behind ground glass plates."

What is needed, therefore, is a device that allows images to be shown on as many computer displays coupled to a computer system as desired, without being limited by the number of available open slots in a bus or the number of displays driven by one video card.

SUMMARY OF THE INVENTION

According to one aspect of the present invention, a remote monitor controller includes an input module that receives a stream of digital data. The input module is linked to a microcontroller that converts the digital data into image display data, which is stored in a video RAM module. An output module converts the image display data stored in video RAM into analog signals that are sent to a display unit where the image is shown.

According to another aspect of the present invention, image data is provided to at least one computer display. First data representing an image is generated by a generating device, such as a personal computer. Then the data is addressed to one or more of the display units and sent along a computer network to the associate display units. At the addressed display unit, the image data is retrieved from the computer network, converted and stored as a locally-stored image. The locally-stored image is then shown on the display unit until another image is stored.

DETAILED DESCRIPTION OF THE INVENTION

Figure 1:
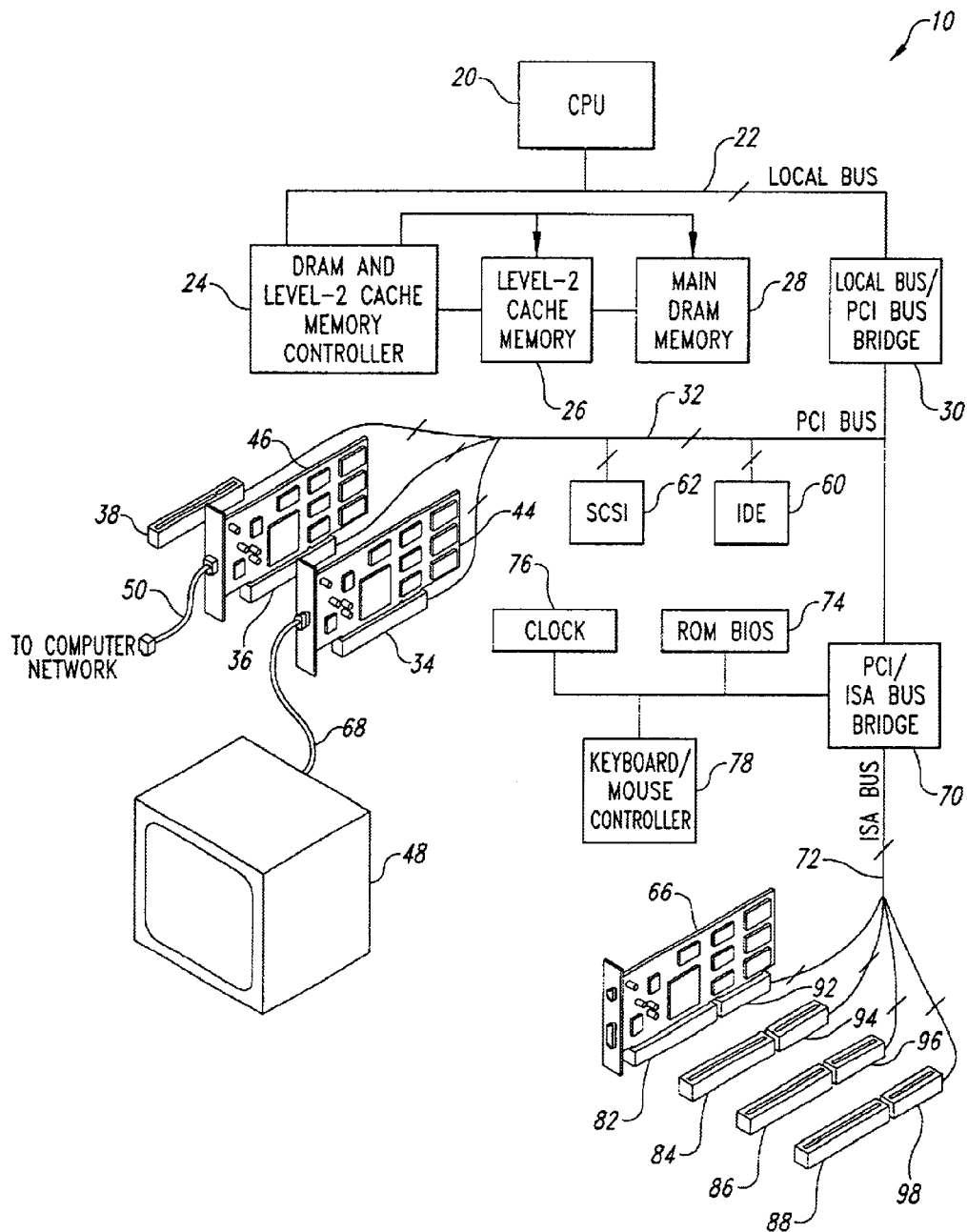
FIG. 1 is a functional diagram of a computer system as is known in the prior art.
Figure 2:
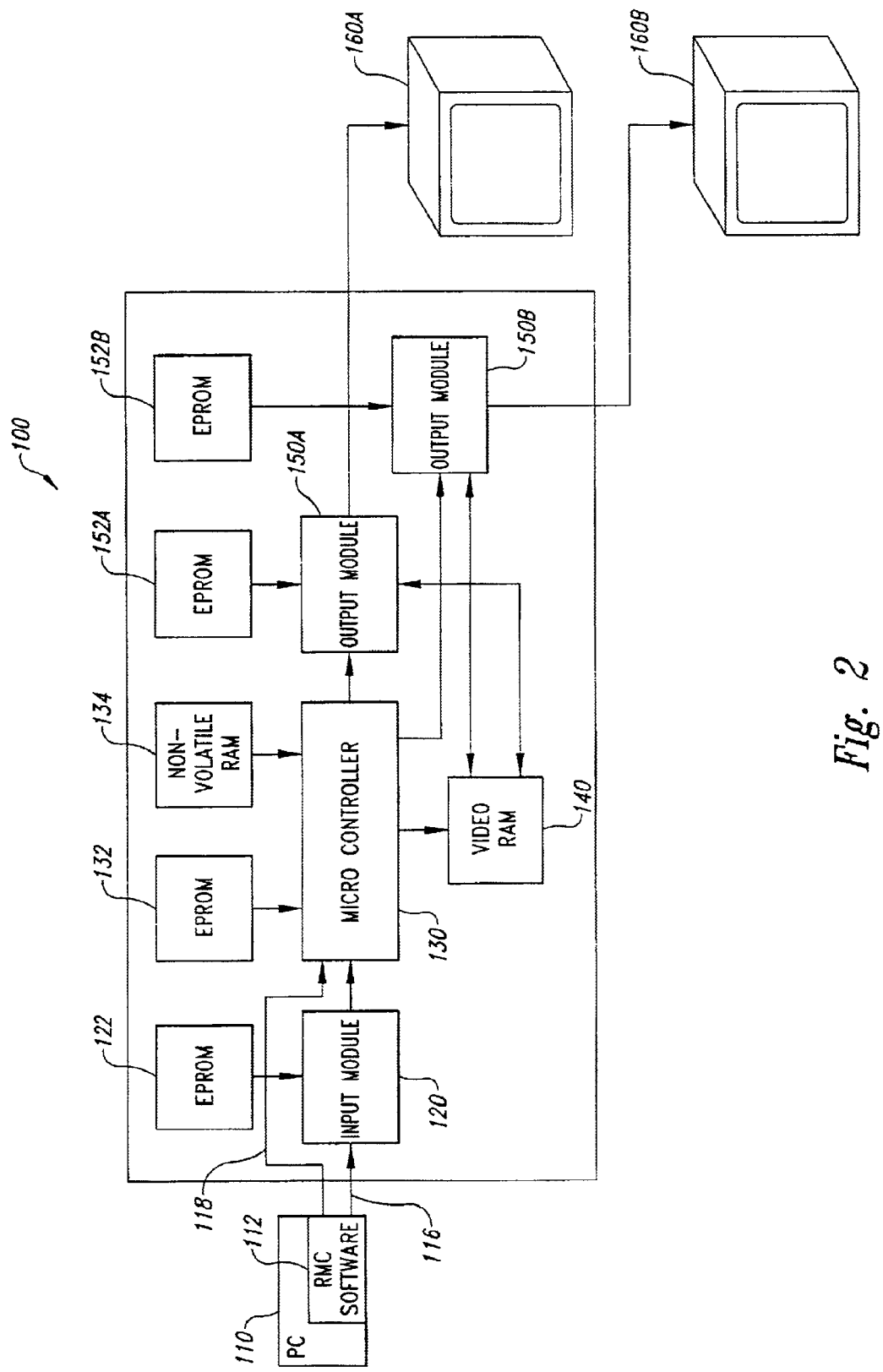
FIG. 2 is a functional block diagram of a remote monitor controller according to an aspect of the present invention.

An embodiment of a remote monitor controller (RMC) 100 in accordance with the invention is shown in FIG. 2. A personal computer (PC) 110 that is running RMC software 112 provides data to an input module 120 of the RMC 100. The PC 110 can be any device that is capable of generating appropriate image data. For example, the PC 110 can be a traditional computer, such as an IBM PC-compatible computer, a Macintosh, or other Apple computer, or a computer running the UNIX operating system, such as those offered by Sun Microsystems. The RMC software 112 that allows the PC 110 to generate the video signals is developed specifically for or adapted to be run by the particular PC 110 coupled to the RMC 100.

Alternatively, the PC 110 can be a device used only to feed video signals to the RMC 100, such as specially designed hardware running the RMC software 112 and not a general purpose computer. In short, any device that can be programmed to generate appropriate image data signals and is connectable to the RMC 100 can be used.

Data generated by the PC 110 is carried to the RMC 100 by a data cable 116 and/or a data cable 118. In its most simple implementation, the PC 110 may communicate with the RMC 100 over the serial data cable 118 using the RS-232 communication protocol. A jack, such as a DB-9 or DB-25 jack, can be used to couple the RMC 100 to the data cable 118. Other implementations may use a cable 116 compatible with an Ethernet network, such as 10Base2 or 10Base-T. The type of the cables 116, 118 and communication protocol carried over the cables is not critical, as most any cable and protocol that can communicate image data from the PC 110 to the RMC 100 is acceptable, but the method of addressing multiple RMCs (discussed below) and the format of the image data sent over the cable may be different depending on which type of cables and protocols are used.

It is important to note that the image data sent from the PC 110 and carried by the cables 116, 118 is digital data, rather than analog data capable of being directly displayed by a computer display. The conversion of digital data received by the RMC 110 into analog data for use by a computer display is one of the functions of a component of the RMC, discussed in greater detail below.

The data signals sent to the cables 116, 118 by the PC 110 include many different types of data, such as overhead and protocol data, address data, RMC setup data, as well as image data. As measured by quantity, the majority of the data provided to the input module 120 is image data. All of the data sent by the PC 110 to the RMC 100 over the cable 116 is initially received by the input module 120. Depending on the type of data received, the input module 120 will perform different functions. The data sent by the PC 110 to the RMC 100 over the data cable 118 is received directly by the microcontroller 130.

Once the RMC 100 is connected to the cable 116, the input module 120 begins "handshaking" with the PC 110 to establish a data transfer protocol. Once the protocol is established and handshaking is complete, the input module awaits data addressed to the particular RMC.

Because many RMC 100s may be used in a single network installation, and because each display is capable of displaying data independently, each RMC is preferably individually addressable. A variety of address options are available, depending in part on the network to which the RMC 100 is coupled. If the network is a 10-Mbps Ethernet network, the RMC 100 can use standard 6-byte Ethernet addressing. As is known in the art, Ethernet addressing allows a particular single station, a group of stations, or all stations to respond to data sent from the PC 110.

In Ethernet 6-byte addressing, the high-order bit of a destination addresses is 0 for ordinary addresses and is 1 for group addresses. Filling all of the address bits with 1's causes all of the stations to respond, an is termed "broadcasting." Sending the same image data to a group or to all of the RMC 100s in the installation at the same time rather than individually keeps network traffic to a minimum, allowing more image data to be transferred over the network. The software 112 running on the PC 110 allows a user to select an image to be sent to one, a group or all of the RMCs. The software 112 then specifies the hardware addresses to be sent data.

Also as is known in the art, Ethernet addressing can use an address for each device that is specific only to the computer network it is on. Alternatively, the Ethernet devices can use the built-in Ethernet MAC address, which gives every Ethernet device in the world its own unique address.

Other addressing schemes can be used as well, such as Internet Protocol addressing (xxx.xxx.xxx.xxx), where each "xxx" can be replaced with any number from 0 to 255. Of course, if the RMC 100s connect to the PC 110 over the Internet, the addresses of the RMCs will have to be addresses that are available as Internet addresses, or masked outside of the local network. Although addressing the RMCs by groups or all at once is convenient, it is not, strictly speaking, necessary for RMC 100 operation. It will, however, reduce overhead and overall network traffic, thus providing better performance.

Once the data transfer protocol has been established, the input module 120 monitors the cable 116 for data addressed to that particular RMC 100. Once data addressed to the RMC 100 is detected, the input module 120 pre-processes the data. Preprocessing by the input module 120 first includes performing any setup operations sent by the PC 110. These operations can include, for example, turning on or off a display unit 160A, setting the brightness and contrast, and selecting an initial image to display on the display unit.

In an alternative embodiment, setup data for the RMC 100 can be sent directly to the microcontroller 130 by the PC 110 over the data cable 118. The PC 110 may communicate with the microcontroller 130 over the data cable 118 by using the RS-232 protocol. Upon startup, a port address is checked on the microcontroller 130 to receive RS-232 data. This data will preferably only include setup data such as providing a network address or initial settings, etc. However, in still another embodiment, the PC 110 could send video data over the data cable 118 directly to the microcontroller 130, and bypass the input module 120. In this embodiment, there would be no need for the data cable 116, or the input module 120.

Once image data is being fed to the RMC 100, the input module 120 reads the serial stream of data and packages it into readable "chunks" to be parallel loaded into the microcontroller 130. The microcontroller 130 receives, decodes, and assembles the image data it receives from the input module 120 into a form that can be stored into memory, and then stores it in a video RAM 140. The microcontroller 130 then sends a data address to an output module 150 telling the output module where within the video RAM 140 data to be displayed on a display unit 160 is stored. The output module 150 then converts the data stored in the video RAM 140 into signals useable by the display unit 160 and provides them to the display unit.

The RMC 100 may contain one, or more than one output module, 150A, 150B, each coupled to a respective display 160A, 160B. More than one output module 150A, 150B may be used in an installation using multiple displays 160A, 160B located near one another, for instance in an airport. Each output module 150A, 150B reads data from a particular location in the video RAM 140. This location is provided by the microcontroller 130. The number of output modules 150A, 150B is limited only by the size of the video RAM 140, and the number of different images desired to be displayed on the displays 160A, 160B. For example, if all the displays were showing the same image, only a small video RAM 140 would be necessary because all of the output modules 150A, 150B, etc., could reference the same memory location in the video RAM.

The output modules 150A, 150B, like the input module 120, is a drop-in module that is selected based on the type of respective display unit 160A, 160B chosen for the system. As stated above, the display unit 160A, 160B can be a CRT, LCD, FED, or any other device that can communication some visual information, such as an LED sign, programmable marquis lights, or other type of display. Since the output modules 150A, 150B are selected based on what type of display units 160A, 160B are present, the microcontroller 130 can be identical for all RMC 100s. Similarly, the video RAM 140 can be nearly identical for all RMC 100s, but will vary in size depending on what display resolution (VGA, SVGA. SXGA) and color depth, if appropriate, is selected. The output module 150 may be a commercially available video controller chip, or it may be an integrated circuit specially designed to operate in the RMC 100.

The output module 150\a provides data to the display unit 160A in a continuous loop. Once the microcontroller 130 communicates to the output module 150A the address in the video RAM 140 from where the current image is to be displayed, the output module operates in a continuous loop, showing that same image until further notice from the microcontroller.

By continuously showing a static image, the PC 110 does not have to continuously send data to the display unit 160A if the image shown on the display unit is not changing, thus saving bandwidth of the network. It is assumed that the amount of image data sent to any one RMC will be at a fairly low data rate. The maximum rate that the image presented on the display unit 160A can change is directly related to the data rate of the network. If the network is fast enough, some or all of the RMC 100s can be showing moving image data.

Another way to show moving image data on the display unit 160A is to send instructions to the microcontroller 130 causing it to "generate" video by rapidly showing a succession of static images, each stored in a separate memory location of the video RAM 140.

The RMC 100 may include non-volatile memory modules, such as EPROM memory modules 122, 132, 152A and 152B coupled to the input module 120, the microcontroller 130, and the output modules 150A and 150B, respectively. These memory modules may contain codes and data specific to the units to which they are coupled. For example, the memory module 122 may contain the address of the RMC 100, and load it into the input module 120 when the RMC is powered. The memory module 132 can instruct the microcontroller 130 how to format the data, or present operating data to the microcontroller such as how much video RAM 140 is present in the RMC 100. It is possible that the memory module 132 or 152A, 152B stores an initial image or set of images for the RMC 100 to display. When initialized, the memory modules 122, 132, and 152A, 152B each send their data to their respective units. Of course, if more than two output modules 150A, 150B are present in the RMC 100, additional EPROMs 152A, 152B would also be provided, one for each output module.

Additionally, the microcontroller 130 can be fed data from a non-volatile RAM module 134. The RAM module 134 is preferably made of CMOS circuits having a low current drain and powered by a battery or some other storage device (not shown). Data stored in the RAM module 134 would be similar to that stored in the memory module 132, but would be data that is changed more frequently than that of the memory module.

Figure 3:
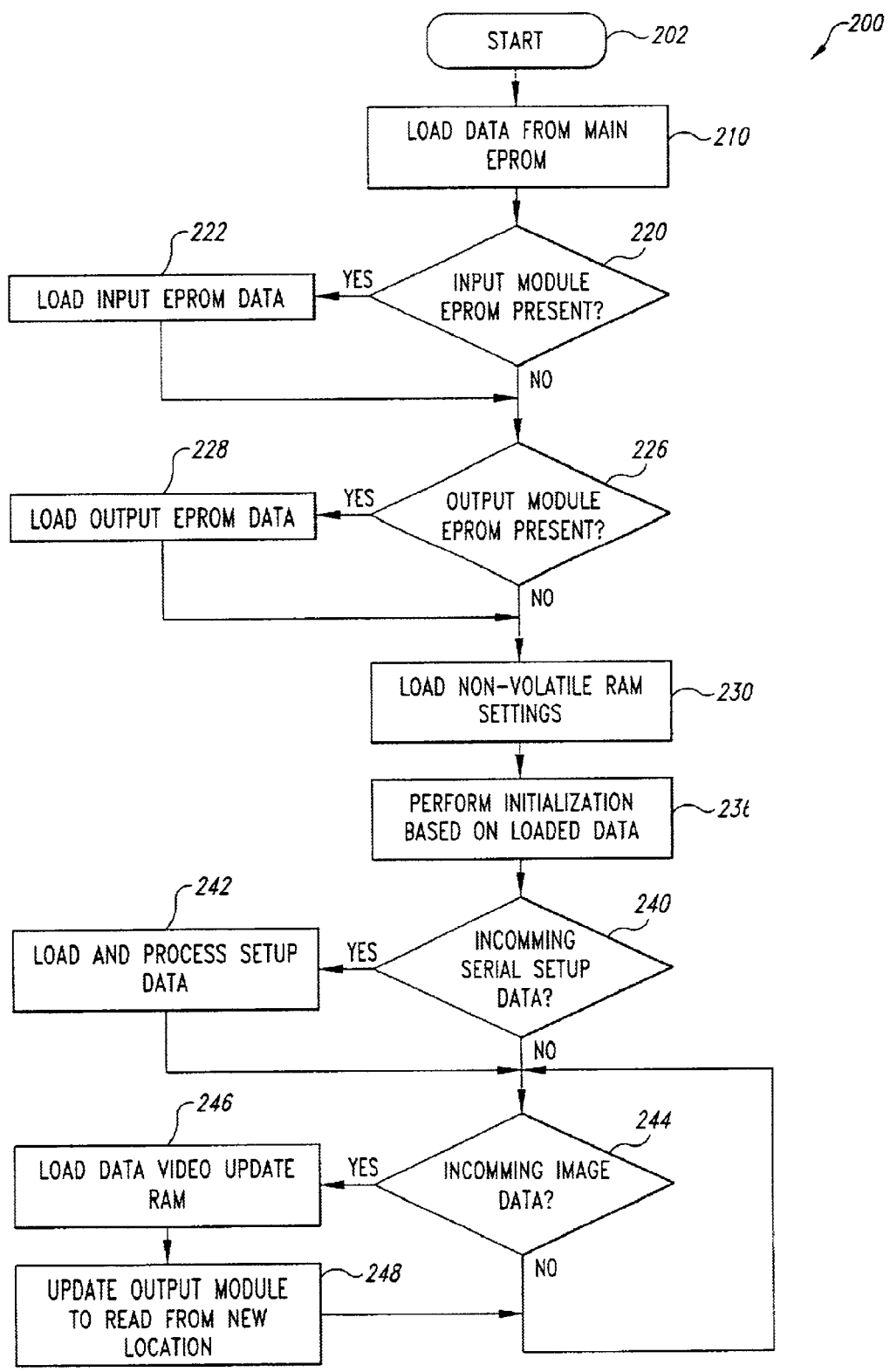
FIG. 3 is a flowchart showing steps of operation within the remote control monitor shown in FIG. 2.

The operation of the RMC 100 will be described with reference to the flowchart 200 illustrated in FIG. 3. The flowchart 200 begins with a start block 202 when the RMC 100 is initially powered. The flowchart 200 then proceeds to a step 210 where data is loaded from the memory module 132 into the microcontroller 130.

Next, in a decision block 220, the presence of the optional memory module 122, which is coupled to the input module 120, is checked. If the memory module 122 is present, data is loaded from the memory module into the input module 120 in a step 222. Similarly, in a step 226, the presence of the memory module 152 coupled to the output module 150 is checked. If present, data from the memory module 152 will be loaded into the output module 150 in a step 228. In a step 230, the settings from the non-volatile RAM 134 are loaded into the microcontroller 130.

Once the data has been loaded from the memory modules 122, 132, and 152, and the non-volatile RAM 134, the RMC 100 performs initialization operations as dictated by the loaded data in an initialization step 236.

Following this initialization step 236, the input module 120 checks for incoming serial setup data in a decision block 240. If the serial setup data is provided by the data cable 118 directly to the microcontroller 130, a port address of the microcontroller will be checked or polled. If, instead, the input module 120 is receiving setup data, the setup data is loaded, processed, and sent to the microcontroller 130 in a step 242. Following that step, a decision block 244 checks for the presence of image data being read by the input module 120. If the input module 120 is reading image data, that data is sent to the microcontroller 130. Alternatively, the microcontroller may receive the video data directly from the data cable 118. Then, the data is formatted and loaded into the video RAM 140 by the microcontroller 130. This occurs in a step 246. In a step 248, the microcontroller 130 sends a notice to the output module 150A or 105B that the image stored within the video RAM 140 has changed, and sends to the output module the new address of the new image data. Also in the step 248, the output module 150A formats the signals that make up the image sent by the PC 110 and sends them to the display unit 160A. The flowchart 200 then loops back to receive more data.

Figure 4:
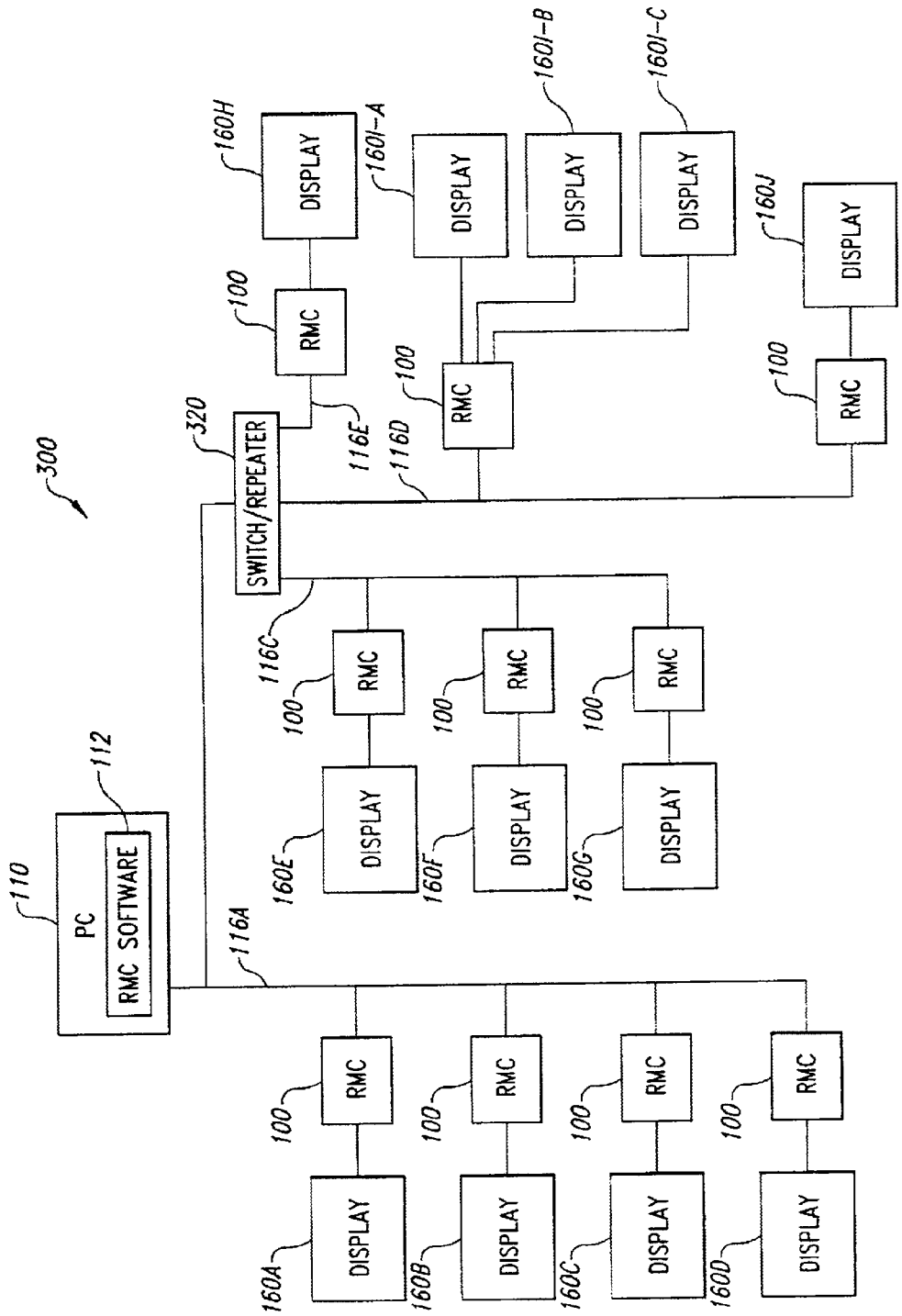
FIG. 4 is a block diagram showing an implementation of one personal computer with multiple displays using the remote monitor controller of FIG. 2.

FIG. 4 is a diagram of a display installation 300 having one PC 110 that feeds image data to twelve display units 160A–160J. Also shown are ten RMCs 100, each coupled to a respective display unit with the exception of the RMC that is coupled to three displays 160I-A, 160I-B and 160I-C. The PC 110 utilizes RMC software 112 to manage what image data is sent to each display unit. As stated above, the non-volatile RAM 134 or the EPROM 132 may contain data that, upon initialization of the RMC 100, loads an initial image to the respective display unit 160. For instance, if the display installation 300 is within an airport, the EPROM 132 or the non-volatile RAM 134 may contain codes that allow the microcontroller 130 of each RMC 110 to produce a logo on the respective display. Then, data is sent from the PC 110 to each individual display unit 160A–160H. After the image data has been sent to the respective RMC 100, a new image is produced by the microcontroller 130 and stored in the video RAM 140. The output module 150 within the RMC 100 then continues to show the same image stored in the video RAM 140 until more image data is received by the input module 120. The RMC 100 coupled to the three displays 160I-A, 160I-B and 160I-C will have three output modules, 150A, 150B and 150C, each coupled to its respective display.

In the display installation 300, the image data is sent to the respective displays over the cable 116. For instance, the display units 160A–160D receive image data from the PC 110 over a cable 116A. The cable 116A is directly coupled to the PC 110, with each RMC 100 coupled to display units 160A–160D having a tap connection into the cable 116A.

A cable 116B feeds a switch/repeater 320 with the image data destined for display units 160E–160H. The switch/repeater 320 can amplify the signal being sent from the cable 116B. Additionally, the switch/repeater 320 can filter the image data so that only data destined for one of the displays on the downward side of the switch will be sent along a particular cable. For example, a cable 116C will only carry data destined for the display units 160E–160G. Similarly, a cable 116D will only contain data destined for the display units 160I and 160J. Finally, a cable 116E only carries data destined for the display unit 160H. In this way, data on the local cables 116C, 116D and 116E contain less traffic than, for instance, the cable 116B.

Recall that each of the RMCs 100 have an independent address and may include a group address. Additionally, all of the RMC 100s can be accessed at the same time with a broadcast. Because of this addressing scheme, data destined for an entire group of display units, for instance, 160A–160D, need only be sent once from the PC 110. This reduces traffic on the cables 116 and ultimately allows more data to be sent from the PC 110 to the display units 160A–160J.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A remote monitor controller, comprising:
   an input module structured to receive a stream of first and second input data and to output the input data in parallel;
   a microcontroller coupled to the input module and structured to receive the parallel output of input data from the input module and to convert the input data into first and second image display data;
   a video RAM module coupled to the microcontroller and structured to receive and store the first image display data in a first memory location and the second image display data in a second memory location specified by the microcontroller; and
   first and second output modules coupled to the microcontroller and the video RAM module, the first output module being structured to retrieve the image display data stored in the first memory location and the second output module being structured to retrieve the image display data stored in the second memory location, each output module being further structured to convert the image display data to first and second analog video signals capable of being independently displayed as first and second images on first and second display units, respectively.

2. The remote monitor controller of claim 1 wherein at least one of the first and second output modules is structured to continuously convert the image display data stored in the first memory location until instructed to change locations.

3. The remote monitor controller of claim 2 wherein the microcontroller is structured to store a second set of image display data in a second memory display location of the video RAM module while the output module continues to convert the image data stored in the first memory location.

4. The remote monitor controller of claim 3 wherein, once the second set of image display data is stored in the second location of the video RAM, the microcontroller is structured to notify at least one of the first and second output modules of the second memory location, and the respective one of the first and second output modules is structured to convert the image display data stored in the second memory location of the video RAM module to video signals capable of being displayed as another image on the respective first or second display unit.

5. The remote monitor controller of claim 1, further comprising a non-volatile memory module coupled to at least one of the modules for providing output to control the processing of the digital data.

6. The remote monitor controller of claim 1 wherein the remote monitor controller is uniquely addressable and an address for the remote monitor controller is stored in non-volatile memory.

7. The remote monitor controller of claim 1 wherein the input module is structured to receive the stream of digital data as serial digital data over a cable coupled to an Ethernet data network.

8. A remote monitor controller, comprising:
   a data input module that receives a plurality of different input data;
   an image data converter coupled to the input module, the image data converter receiving the plurality of different input data from the input module and converting the plurality of different input data into a plurality of different image display data;
   an image storing RAM coupled to the image data converter, the RAM receiving the plurality of different image display data and having a plurality of different memories locations specified by the image data converter for storing the plurality of different image display data; and a plurality of output modules coupled to the image data converter and to the RAM, each output module being coupleable to a plurality of different display devices and structured to retrieve the image display data from the plurality of different memories locations and convert the plurality of different image display data to a plurality of different analog signals for display on the plurality of different display devices.

9. The remote monitor controller of claim 8 wherein each output module converts the image display data stored in the image storing RAM into analog signals capable of being displayed one a different type of display device.

10. The remote monitor controller of claim 9 wherein the image data converter stores a second set of image display data in a second memory location of the RAM memory module while at least one of the output modules continues to convert the image display data stored in the first memory location.

11. The remote monitor controller of claim 10 wherein, once the second set of image display data is stored in the second location of the RAM memory module, the image data converter provides an address of the second location to the plurality of output modules, and at least one of the output modules then converts the image display data stored in the second location of the RAM memory module.

12. The remote monitor controller of claim 8, further comprising a non-volatile memory module coupled to at least one of the modules for providing output to control the processing of the digital data.

13. The remote monitor controller of claim 8 wherein the remote monitor controller is uniquely addressable and an address for the remote monitor controller is stored in non-volatile memory.

14. The remote monitor controller of claim 8 wherein the input module receives serial digital data over a cable coupled to an Ethernet data network.

15. An installation of display devices coupled to a computer network, the installation comprising:

an image generating device that places a plurality of different digital image data on the computer network;

at least one remote monitor controller coupled to the computer network, each remote monitor controller including:

an input module coupled to the computer network and structured to receive a stream of the plurality of different digital data and to convert the plurality of different digital data into a plurality packages and to output the plurality packages in parallel, a microcontroller coupled to the input module and structured to receive the parallel output of plurality of packages from the input module and to convert the plurality of packages into a plurality of different image display data, a video RAM module coupled to the microcontroller and structured to store the plurality of different image display data in a plurality of different memory locations specified by the microcontroller, and a plurality of output modules coupled to the microcontroller and the video RAM module, each output module being structured to convert the image display data stored in one of the plurality of different memory locations of the video RAM module to signals capable of being displayed as an image on a different type of display device; and a plurality of display devices, each display device coupled to a respective one of the output modules.

16. The remote monitor controller of claim 15 wherein each output module converts the image display data stored in the image storing RAM into analog video signals.

17. The remote monitor controller of claim 16 wherein the microcontroller is structured to store a second set of image display data in a second memory display location of the video RAM module while the plurality of output modules continue to convert the image data stored in the first memory location.

18. The remote monitor controller of claim 17 wherein, once the second set of image display data is stored in the second location of the video RAM, the microcontroller is structured to notify the plurality of output modules of the second memory location, and the plurality of output modules is structured to convert the image display data stored in the second memory location of the video RAM module to a second set of signals capable of being displayed as another image on the plurality of display devices.

19. The remote monitor controller of claim 15 further comprising a non-volatile memory module coupled to at least one of the modules for providing output to control processing of the digital data.

20. The remote monitor controller of claim 19 wherein the remote monitor controller is uniquely addressable and an address for the remote monitor controller is stored in the non-volatile memory.

21. The remote monitor controller of claim 20 wherein the computer network is an Ethernet data network.

22. An installation of a plurality of computer displays, comprising:

an image generating device;

a plurality of remote monitor controllers, each remote monitor controller coupled to one or more of the computer displays and each remote monitor controller including an input unit capable of receiving a string of first and second serial image data destined for a particular address and converting the first and second digital data into first and second readable packages and outputting the first and second readable packages in parallel, the first and second image data selected to be sent to different first and second addresses determined by the image generating device, a microcontroller coupled to the input unit and capable of receiving the parallel output of first and second readable packages from the input unit and converting the first and second readable packages into storable first and second digital images, a memory storage unit coupled to the microcontroller capable of storing the first and second storable images in first and second locations specified by the microcontroller, and first and second output modules coupled to the microcontroller and to the memory storage unit, the output modules being capable of providing first and second video signals corresponding to the first and second stored digital images to first and second displays, respectively, at least until another image for at least one of the first and second displays is received at the input.

23. The installation of claim 22 wherein at least one of the microcontrollers is structured to store a second string of serial image data in the memory storage unit while the respective first and second output modules continue to provide the video signals to the associated display.

24. The installation of claim 23 wherein, in at least one of the remote monitor controllers, once the second converted string of serial image data is stored in a respective memory storage unit, the coupled microcontroller is structured to send a signal to the respective first and second output modules indicating a location of the stored second converted string.

25. The installation of claim 22 wherein at least one of the remote monitor controllers, further comprises a non-volatile memory module coupled to the input for providing output to control processing of the digital data.

26. The installation of claim 25 wherein an address for at least one of the remote monitor controllers is stored in its non-volatile memory.

27. The installation of claim 22 wherein at least one of the first and second output modules converts the stored digital image into analog video signals capable of being displayed as an image on the respective one of the first and second displays.

28. A method of providing image data to a plurality of remote computer display units, the method comprising:
   generating a plurality of different image data for different display units;
   addressing the plurality of different image data a corresponding plurality of the display units;
   placing the plurality of image data on a computer network;
   at each of the plurality of addressed display units, retrieving the image data from the computer network;
   converting the plurality of image data into a plurality of locally-stored images in an image data converter;
   storing the plurality of locally-stored images in a memory device at a plurality of different locations determined by the image data converter;
   retrieving the plurality of locally-stored image into a plurality of output modules;
   using each output module, converting one of the locally-stored images into an analog signal formatted for a respective one of the display units; and
   continuously showing the locally-stored image on the display units.

29. The method of claim 28, further comprising:
   formatting the image data prior to storing the locally-stored image.

30. The method of claim 28 wherein each of the display units has a unique address on the computer network.

31. The method of claim 28, further comprising:
   once a second image is locally stored, displaying the second locally-stored image on at least one of the display units.

32. A method of providing image data to a plurality of computer display units, the method comprising the steps of:
   generating a plurality of image data using software running on a general purpose computer;
   using the software to address the plurality of image data to a plurality of the display units;
   placing the plurality of image data on a computer network by the computer;
   at each of the plurality of addressed display units, retrieving the image data from the computer network;
   converting the plurality of image data into a plurality of locally-stored images in an image data converter;
   storing the plurality of locally-stored images in a memory device at a plurality of different locations determined by the image data converter;
   retrieving the plurality of locally-stored image into a plurality of output modules;
   using each output module, converting the locally-stored image into a plurality of output signals, each output signal being formatted for a respective one of the display units; and
   continuously showing the locally stored image on the display units.

33. The method of claim 32, further comprising:
   formatting the image data prior to storing the locally-stored image.

34. The method of claim 32 wherein each of the display units has a unique address on the computer network.

35. The method of claim 32, further comprising:
   once a second image is locally stored, displaying the second locally-stored image on at least one of the display units.

36. A remote monitor controller, comprising:
   a data input module connectable to a data network and structured to receive an activation signal and an input data stream from a one or more remotely-located PCs over a data network and to convert the input data stream into packages and to output the packages in parallel;
   a data converter coupled to the input module and having an image display data output, the data converter structured to receive the parallel output of packages from the data input module and to convert the packages into a display signal;
   an image storage RAM coupled to the data converter and having a first memory location specified by the data converter for storing a first display signal and a second memory location for storing a second display signal different from the first; and
   a plurality of output modules coupled to the data converter and the image storage RAM for converting the first and second display signals stored in the first memory location into corresponding first and second analog signals, each analog signal capable of being displayed as a different image on a different display unit.

37. A system comprising a plurality of remote monitor controllers connected by a data network to one or more remotely-located PCs, comprising:
   at least two addressable remote monitor controllers, such remote monitor controllers each comprising:
      a data network;
      a data input module connectable to said data network and structured to receive an activation signal and a digital data stream from one or more remotely-located PCs over such data network and to convert the digital data stream into readable packages and to output the readable packages in parallel;
      a digital data converter coupled to the input module and having an image display data output, the digital data converter structured to receive the parallel output of readable packages from the data input module and to convert the readable packages into digital image display data;
      an image storage RAM coupled to the digital data converter and having a first and second memory locations specified by the digital data converter for storing first and second different image display data; and
      first and second output modules coupled to the image data converter and the image storage RAM for converting the image display data stored in the first and second memory location into first and second signals capable of being displayed as different first and second images on first and second display units, respectively.

38. The system of claim 37 wherein the summed bandwidth of the data signals transmitted to said at least two remote monitor controllers is less than the bandwidth of the data network.

39. The system of claim 37 wherein said image storage RAM further comprises a second memory location for storing image display data and wherein said first and second output modules are constructed to change from converting the image display data stored in the first memory location to converting the image display data stored in the second memory location upon completion of loading of an image in said second memory location.

40. A method for controlling at least two monitors comprising the steps of:

connecting at least two remote monitor controllers to a data network;

connecting each of said at least two remote monitor controllers to a plurality of local monitors;

providing independent addresses for each of said at least two remote monitor controllers;

connecting a serial digital data stream source to said data network remote from said at least two remote monitor controllers;

transmitting digital data streams addressed to selective ones of said at least two remote monitor controllers over said data network from said digital data stream source;

determining by the addressed remote monitor controller that a digital data stream addressed to the addressed remote monitor controller is being transmitted over the network;

receiving of said digital data streams by the addressed one of said at least two remote monitor controllers;

processing and storing said digital data stream as image display data in at least two different RAM memory locations of the addressed remote monitor controller, wherein processing and storing the digital data stream includes converting the digital data stream into a plurality of packages of digital image data and converting the plurality of packages of digital image data into image display data in an image converter; and using first and second output modules coupled to the RAM memory locations, converting the image display data in each of said RAM memory location specified by the image converter into a video signal from the addressed one of the remote monitor controllers to at least one of the local monitors until a new digital data stream addressed to at least one remote monitor controller is received and stored in a third RAM memory location specified by the image converter as image display data and then switching from converting the image display data from at least one of the two RAM memory location into a video signal to converting the image display data in the third RAM memory location into a video signal to another one of the local monitors.

* * * * *